J. W. HUMPHREYS.
Ditching-Machines.

No. 145,736.  Patented Dec. 23, 1873.

Witnesses.
Wm Howard
Joseph Forrest

Inventor.
James Wm Humphreys,
By Theodore Mungen,
Atty.

UNITED STATES PATENT OFFICE.

JAMES W. HUMPHREYS, OF OXFORD, INDIANA.

IMPROVEMENT IN DITCHING-MACHINES.

Specification forming part of Letters Patent No. 145,736, dated December 23, 1873; application filed May 23, 1873.

*To all whom it may concern:*

Be it known that I, JAMES WILLIAM HUMPHREYS, of Oxford, in the county of Benton and State of Indiana, have invented a new and useful Improvement in Ditching-Machines; and I hereby declare the following to be a full, clear, and exact description of the same, reference being had to the accompanying drawing making a part of this specification, in which—

Figure 1:
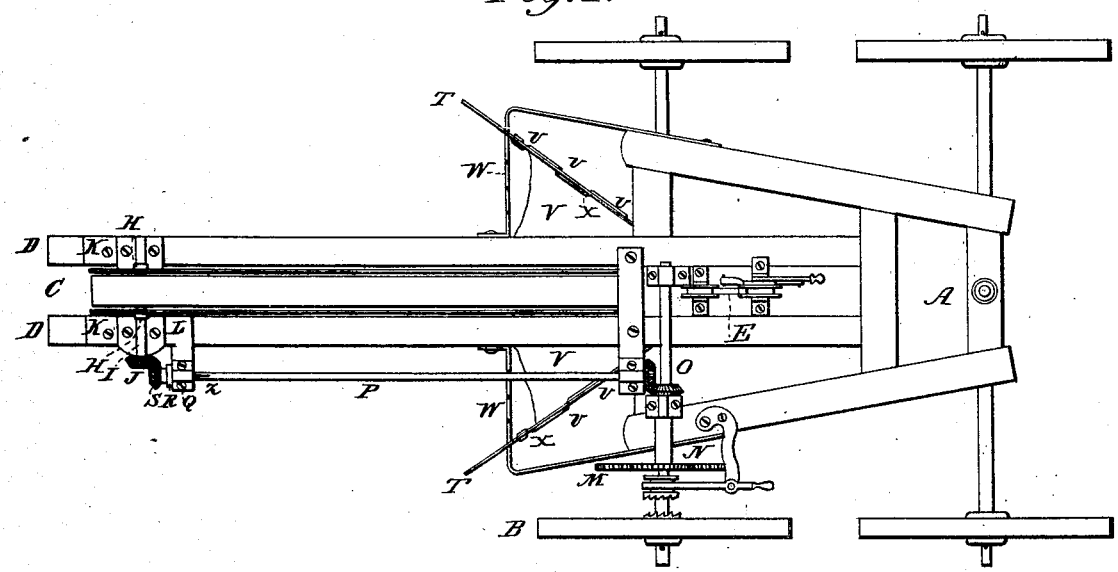
Figure 2:
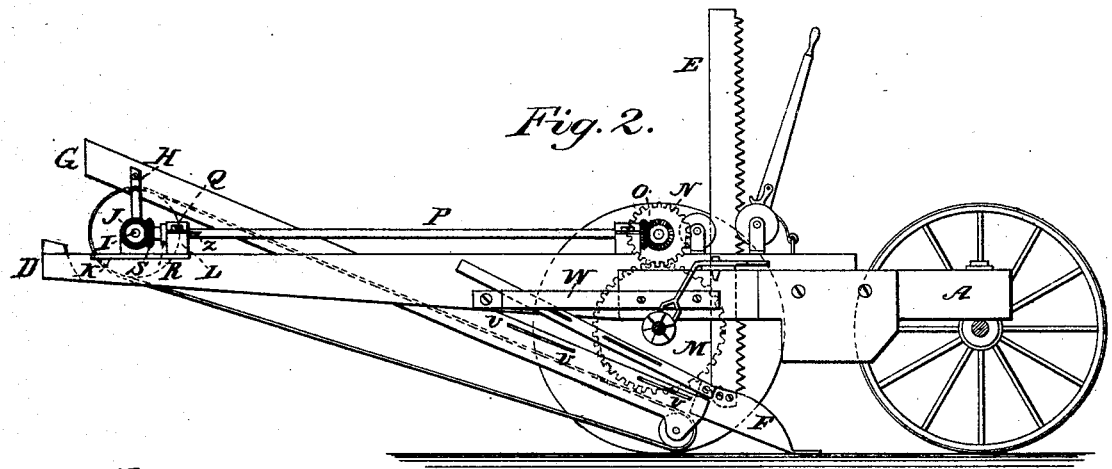

Figure 1 is a plan view, and Fig. 2 is a side elevation, of a machine embodying my invention.

This invention relates to an improvement in ditching-machines; and consists, first, of a chute secured at its lower end to an adjustable cutter, and at its upper end to a movable seat, which carries the gearing for receiving motion indirectly from the driving shaft, and communicating it to the endless belt with which the chute is provided, the whole being so arranged that by adjusting the cutter to any desired position the movable seat will be drawn forward or pushed backward, as the case may be, by the chute, the latter, at the same time, being permitted to assume the angle necessitated by the adjustment of the cutter; secondly, of a knife provided with an apron, arranged to be secured to the edge of the chute, having its point constructed to be secured to the rear of the cutter, and its upper end to rest upon a rack secured to the frame of the machine, so that, when attached to the machine, it may be adjusted laterally for the purpose of cutting the sides of the ditch to an oblique angle.

In the accompanying drawing, the frame A of the machine is supported on four wheels, one of which, B, is the driving-wheel. The crane C, composed of two parallel beams, D, rests upon the frame A, and extends some distance to its rear. The rack E is constructed so that the cutter F can be adjusted by it vertically. The front end of the chute G is secured to the rear of the cutter F, and the rear end is fixed to the arms H, the lower ends of which are traversed by the lateral shaft I provided with the miter-cog J. Face-plates K, on which the movable seat L slides, are secured to the faces of the beams D near their ends. The axle of the rear wheels of the machine forms the driving-shaft. Motion is transmitted, through the cogs M and N, to the lateral shaft O; thence, through miter-cogs and the counter-shaft P, to the lateral shaft I. A groove, Z, in the counter-shaft P, permits the miter-cog S to move longitudinally thereon; but a pin, the point of which enters the groove, prevents the cog S from revolving, except with the counter-shaft P. The bearing Q, washer R, and miter-cog S move upon the counter-shaft P whenever the movable seat L is moved upon the face-plates K. The knives T are provided with perforations U for securing to them the aprons V. The edges of the chute G, near its front, are also provided with perforations U for the same purpose. The points of the knives T are pivoted to the rear of the cutter F in such a manner as to permit their upper ends to be moved freely. Racks W receive the ends of the knives T, and retain the knives in the position to which they may have been adjusted. The aprons V are preferably secured to the knives T and the chute G by a wire, X, running through perforations in the edges of the aprons and the perforations U in the knives and the chute.

The chute G being secured to the cutter F and fixed to the arms H, a depression of the cutter F draws the movable seat L forward upon the face-plates K, and the gearing upon the counter-shaft P is carried forward with it. Elevating the cutter F causes a backward movement of these same parts. The arms H, to which the chute G is fixed, are loose upon the lateral shaft I, and, therefore, permit the chute to assume the angle necessitated by the adjustment of the cutter F. The knives T are never used until the ditch has been dug to the required depth by the cutter F. They are then attached, one or both, as desired, and set, at first, at a small angle, to cut but little. The angle is gradually increased until the sides of the ditch have been cut to the desired angle.

The aprons V catch the dirt which has been loosened by the knives, and deposit it upon the endless belt, by which it is carried up and deposited upon the surface of the earth in the usual manner.

Having thus described my invention, what I claim as new and useful, and desire to secure by Letters Patent, is—

1. In combination, the chute G, adjustable cutter F, counter-shaft P, connected with the driving-wheel B by gearing M N O, and the movable seat L provided with suitable gearing, as I J Q R S, substantially as and for the purpose hereinbefore set forth.

2. The knife T, provided with the apron V, in combination with the adjustable cutter F, chute G, and rack W, substantially as and for the purpose hereinbefore set forth.

In testimony that I claim the foregoing improvement in ditching-machines, as above described, I have hereunto set my hand and seal this 22d day of April, 1873.

JAMES WILLIAM HUMPHREYS. [L. S.]

Witnesses:
  JAMES A. MCKNIGHT,
  JACOB LAMB.